United States Patent
Notni et al.

(10) Patent No.: US 7,136,170 B2
(45) Date of Patent: Nov. 14, 2006

(54) METHOD AND DEVICE FOR DETERMINING THE SPATIAL CO-ORDINATES OF AN OBJECT

(75) Inventors: Gunther Notni, Jena (DE); Mathias Heinze, Jena (DE); Peter Kuehmstedt, Jena (DE)

(73) Assignee: Fraunhofer-Gesellschaft zur Foerderung der angewandten Forschung e.v., Munich (DE)

( * ) Notice: Subject to any disclaimer, the term of this patent is extended or adjusted under 35 U.S.C. 154(b) by 151 days.

(21) Appl. No.: 10/511,880

(22) PCT Filed: Apr. 23, 2003

(86) PCT No.: PCT/EP03/04210
§ 371 (c)(1),
(2), (4) Date: Oct. 19, 2004

(87) PCT Pub. No.: WO03/091660
PCT Pub. Date: Nov. 6, 2003

(65) Prior Publication Data
US 2005/0174579 A1 Aug. 11, 2005

(30) Foreign Application Priority Data
Apr. 24, 2002 (DE) .................. 102 19 054

(51) Int. Cl.
*G01B 11/24* (2006.01)
*G01N 21/86* (2006.01)

(52) U.S. Cl. ................ 356/601; 356/603; 356/623; 250/559.22; 250/559.29

(58) Field of Classification Search ............... 356/601, 356/602, 603, 604, 610, 611, 614–617, 622, 356/623; 250/559.22, 559.29
See application file for complete search history.

(56) References Cited

U.S. PATENT DOCUMENTS 6,055,056 A * 4/2000 Kuehmstedt et al. ....... 356/601

FOREIGN PATENT DOCUMENTS

| DE | 41 15 445 A1 | 1/1992 |
|----|---|---|
| DE | 41 20 115 C2 | 12/1992 |
| DE | 195 36 296 A1 | 4/1997 |
| DE | 195 36 297 A1 | 4/1997 |
| DE | 196 37 682 A1 | 3/1998 |
| DE | 100 25 741 A1 | 11/2001 |
| EP | 0 923 705 B1 | 6/1999 |
| EP | 1 127 245 B1 | 8/2001 |
| WO | WO 00/26615 | 5/2000 |

* cited by examiner

Primary Examiner—Gregory J. Toatley, Jr.
Assistant Examiner—Roy M. Punnoose
(74) Attorney, Agent, or Firm—Marshall & Melhorn LLC

(57) ABSTRACT

The invention relates to a method for determining the spatial co-ordinates of an object, whereby the object is illuminated with patterns of light from at least two directions by means of a projection device. A calibrating camera and at least one measuring camera at least partially record the patterns of light projected onto the object, the calibrating camera being fixed in relation to the object. The projection device is calibrated by means of at least four phase measuring values, the measuring camera is calibrated using at least two phase measuring values, the three-dimensional co-ordinates of the object are calculated using at least one phase measuring value. The projection device and the measuring camera are thus transferred together into the desired positions.

16 Claims, 4 Drawing Sheets

METHOD AND DEVICE FOR DETERMINING THE SPATIAL CO-ORDINATES OF AN OBJECT

BACKGROUND OF THE INVENTION

The invention concerns a method for determining the spatial coordinates of an object according to the introductory part of the main claim as well as a device for carrying out the method.

For the contactless two-dimensional detection of surface shapes, surface geometries or coordinates of selected points, various optical principles are employed. A common feature of all the methods here is that determination of the 3-D coordinates of a surface measuring point is possible only if there are at least three independent measured values for this point. In addition, assumptions about the geometry of the measuring system are included in the result.

One method is the conventional strip projection technique, which is carried out with one or more CCD cameras and a projector (DE 41 20 115 C2, DE 41 15 445 A1). In devices of this kind, the grid lines or Gray code sequences are projected onto the surface to be measured. A CCD camera records on each of its receiver elements the intensity of a picture element on the surface. With known mathematical algorithms, phase measurements are calculated from the intensity measurements. The desired object coordinates can subsequently be calculated from the phase measurements and the image coordinates of the measuring points in the image plane of the photographic system. A condition of this is, however, knowledge of the geometry of the measuring system (orientation parameters of projector and camera) as well as of the imaging properties of the projection and imaging lens.

The number of orientation parameters to be determined can be limited considerably if only the phase measurements are used for calculation of coordinates. In such systems, the position of a single receiver element in the photographic system determines only the location of measurement, but is not evaluated as measuring information. By lighting the scene from several, but at least three directions of projection with grid lines or Gray code sequences, and viewing with one or more cameras fixed in position in relation to the object, for example, coordinates for a known geometry of the lighting system can be calculated. In all these systems the system parameters (orientation parameters) must be detected separately, this being done typically by so-called pre-calibration of the system. In this case, calibrating bodies of known geometry are measured, by means of which the geometry parameters of the measuring structure are modelled (DE 195 36 297 A1). This procedure is unusable whenever geometry parameters in further measurements cannot be kept constant, for example, due to temperature effects or as a result of mechanical stress on the system, or if, due to the complexity of the measuring task, a variable sensor arrangement is required and therefore measurement with a pre-fixed arrangement does not come into question.

Photogrammetric measuring methods overcome the difficulty of a separate calibrating procedure. The image coordinates here serve as measuring information, that is, the position of the measuring points in the matrix of the photographic system. From at least two different camera positions, the image coordinates for an object point must be known. An advantage of these measuring methods is that one surplus measurement can be obtained to every measuring point, i.e. for two camera positions there is one measurement more than is necessary for calculation of the three coordinates of a point. In this way, with a large enough number of measuring points it is possible to simultaneously calculate coordinates, internal and external orientation parameters of the cameras, and correction parameters for recording. However, difficulties arise in locating the homologous points necessary for this, above all for a very large number of measuring points. For this purpose, in elaborate image processing procedures, textures or surface structures from different photographs must be related to each other (DE 195 36 296 A1). For complete two-dimensional detection of an object surface, this is not possible with justifiable expense. Also, markings are required as link points for joining the partial views together.

In DE 196 37 682 A1 is proposed a system which overcomes these problems. Here, a projection system illuminates the scene with a series of strip images, consisting of two sequences turned through 90° to each other. Such strip images projected from two different positions onto the object allow, at the same time viewing with a fixed-position camera, evaluation according to the functional model of photogrammetry. Drawbacks of this system concept arise above all in the case of complete measurement of complex objects. With the complexity of the object to be measured, there is also an increase in the number of views necessary. But it is not sensible to increase the number of cameras, because there is an item of measuring information only at one object point which is both illuminated from two different directions and viewed by the camera. Adjustment of the measuring system, i.e. orientation of the required cameras, is furthermore all the more difficult, the more views have to be set up. For complex measuring tasks, such prospective orientation of the sensor system is not always satisfactory. A drawback of known methods is, moreover, that the result of measurement is always available for an assessment only at the end of the complete measuring process. Intermediate evaluation and, based on this, adapted positioning of the projector and camera(s) are not possible here.

From DE 100 25 741 A1 is known a method for determining the spatial coordinates of objects and/or their variation in time, in which the object is in each case illuminated from at least two directions with a series of light patterns which are recorded with a two-dimensional-resolution sensor arrangement, this being for picking up different views with different positions of the sensor arrangement. In this case, with a new position of the sensor arrangement, at least one direction of projection is selected so as to correspond to a direction of projection of the preceding position of the sensor arrangement. With these two directions of projection the phase measurements are identical, and from them can be determined a linking rule between the recording points of the sensor arrangement for the new and the preceding position. This system is self-calibrating, i.e. no geometrical or optical system variables have to be known or pre-calibrated before measurement. Calibration takes place with this known method during measurement, i.e. the calibrating camera is simultaneously the measuring camera. This method is not satisfactory with complex objects, for example, because shadows cannot be avoided.

SUMMARY OF THE INVENTION

It is the object of the invention to provide a method for determining the spatial coordinates of an object, with which measurement of complex objects is possible without markings or textures, without locating homologous points and without geometrical or optical system variables having to be known or pre-calibrated, wherein the number of possible directions of photography is not limited by the number of cameras and wherein the measuring time can be reduced.

This object is achieved by a method for determining the spatial coordinates of an object, in which the object is illuminated with light patterns with a projection device from at least two directions, and the projected light patterns are recorded point by point on the object with a two-dimensional-resolution first recording device, wherein, for the respective recorded points of the surface of the object, phase values are determined and these are used to calculate geometrical parameters and spatial coordinates of the points, characterised in that the light patterns or portions thereof projected onto the object from the at least two directions are additionally recorded point by point by at least one second recording device, wherein the at least one second recording arrangement remains stationary in relation to the object to be measured, and in that from the points of the projected light patterns recorded with the second recording device are determined at least four phase measurement values from which the geometrical parameters of the projection device for the at least two directions of projection are calculated.

Due to the fact that the light patterns projected from the at least two directions onto the object are picked up as an image point by point not only in each case by an associated first recording device, but additionally by at least one second recording device, wherein the at least one second recording device remains stationary in relation to the object to be measured and is not moved like the projection device and the first recording device, and that from the points of the projected light patterns recorded with the second recording device are determined at least four phase measurement values from which the parameters of the projection device for all directions of projection are determined, it is possible to perform calibration of the system in a separate manner from measuring. The object can be detected from any number of directions on account of the freely movable sensor arrangement, consisting of projection device and first recording device. The data necessary for calibration are gathered during measurement recording, separation being accomplished between stationary calibrating camera and movable measuring camera. This increases the flexibility of the measuring arrangement in the sense of a mobile sensor. The number of object views to be digitised is basically free and not limited to the number of cameras used, but can be greater. Due to self-calibration, the measuring sensor arrangement can be subject to mechanical changes during the measuring cycle without these affecting the result of measurement.

As four phase measurement values are necessary for determining the geometrical parameters of the projection device, only two phase measurement values for those of the first recording device, and only one phase measurement value for calculating the three-dimensional coordinates, the measuring time can be shortened considerably.

Due to the measures provided in the subsidiary claims, advantageous developments and improvements are possible.

In general, complex objects can be measured with the method according to the invention. Locating marks fixed to the object or specially projected or special object properties for locating the homologous points are not needed to build up a picture. Elaborate matching procedures are therefore completely eliminated. By contrast, free virtual marks are available through the pixel matrix of the stationary calibrating camera(s). Object interaction is thus avoided. Technically very simple automatic measuring systems can be constructed. Nevertheless, these objects which are complex in position can be detected completely and two-dimensionally. For the change of position of the sensor arrangement, expensive precision guiding means or handling systems are not necessary. For the assignment of partial areas to the whole three-dimensional image, overlapping of the partial areas respectively detected with the sensor arrangement is not necessary.

BRIEF DESCRIPTION OF THE DRAWINGS

The invention is shown in the drawings and described in more detail in the description below. The drawings show.

DESCRIPTION OF THE PREFERRED EMBODIMENTS

The method of the invention is described below using FIGS. 1, 2 and 3. The object 1 to be measured is, for example, fastened to a measuring table and illuminated by a projector 3 forming part of a sensor arrangement 2 on a stand. A camera 4 also forming part of the sensor arrangement 2 takes the picture of the illuminated object 1 or object area. In the practical example, the recording device designed as a camera is a CCD camera on a stand.

Figure 2:
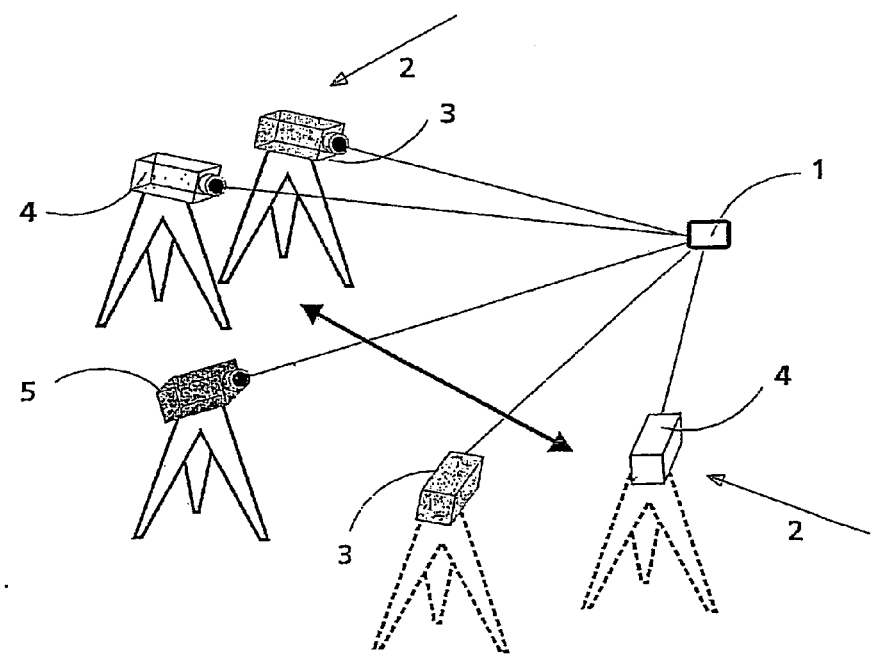
Figure 3:
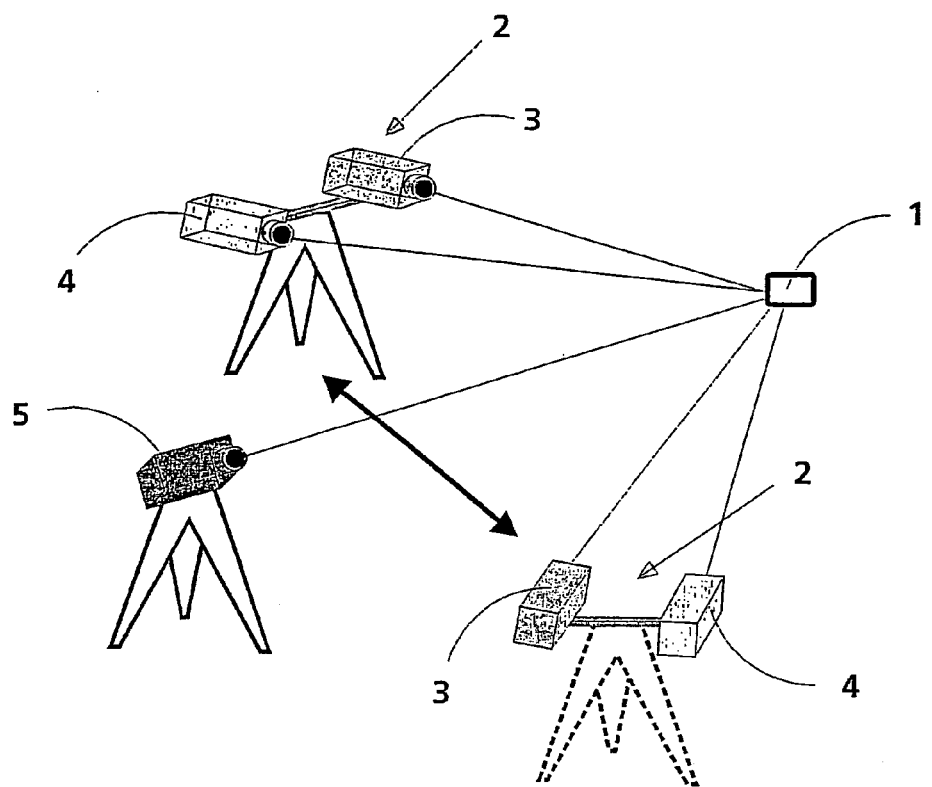

In FIG. 2 the projector 3 and the camera 4 are independent of each other, while in FIG. 3 projector 3 and camera 4 are rigidly connected to each other on a stand, which leads to simplification of recording the measurements. FIGS. 2 and 3 show the sensor arrangement 2 in two different positions, position 1 being shown with unbroken lines and position 2 with broken lines.

The projector 3 projects, onto the object 1 or object area to be measured, light patterns which are designed as line grids and/or Gray code sequences. The camera 4 records on each of its receiver elements the intensity of the strip images reproduced on the object 1, as measurement values. Then the grid and/or the Gray code sequence is turned through 90° and again projected onto the object 1, the axis of rotation lying parallel to the optical axis of the projection system.

Furthermore, there is provided a so-called calibrating camera 5 which is also designed as a CCD camera and takes pictures of the object 1 or an object area. Instead of the calibrating camera, photodetectors may be provided, and since only a limited number of measuring points have to be taken, as a minimum number only three photodetectors have to be used.

Figure 1:
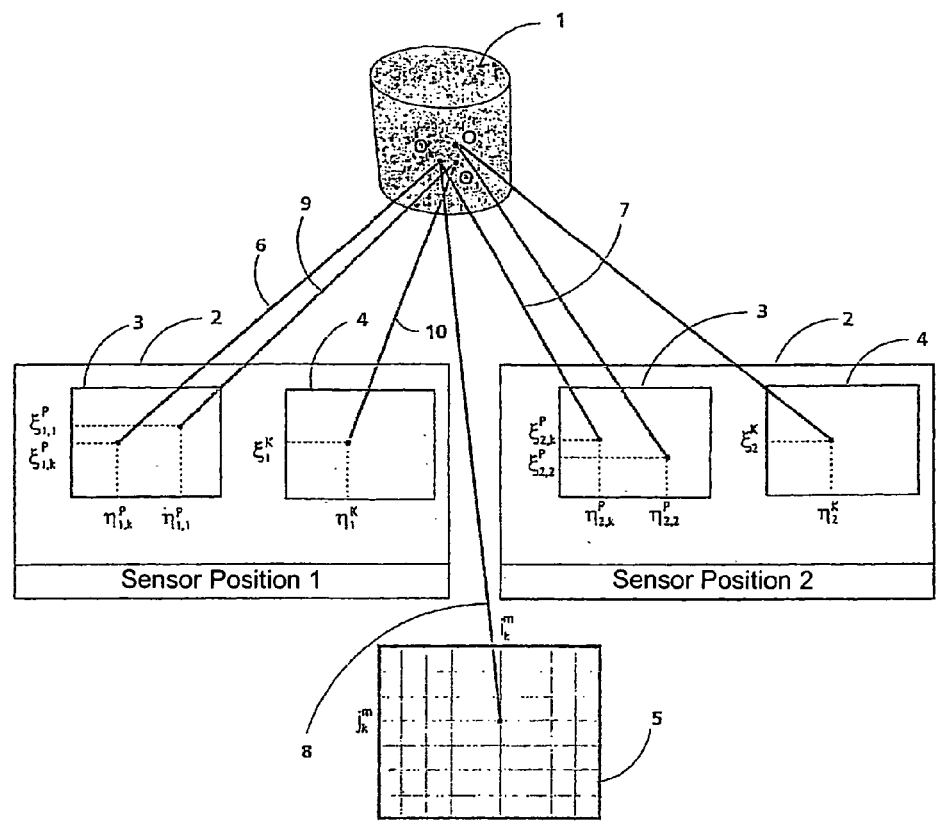
FIG. 1 a schematic view of the measuring cycle according to the method of the invention, FIG. 2 a first embodiment of a measuring device used with the method of the invention, FIG. 3 a second embodiment of a device for carrying out the method of the invention, FIG. 4 a third embodiment of a measuring device for carrying out the method of the invention, FIG. 5 a fourth embodiment of a measuring device for carrying out the method of the invention, FIG. 6 a fifth embodiment of a measuring device for carrying out the method of the invention, and FIG. 7 a sixth embodiment of a measuring device for carrying out the method of the invention.

In FIG. 1 are shown the basic relationships in the measuring cycle. From the sensor position 1 which is shown in unbroken lines in FIGS. 2 and 3, as stated above, light patterns are projected with the projector 3 onto the object 1 in such a way that two phase fields rotated through an angle (at the optimum through 90°) to each other are obtained, as a result of which each measuring point on the object 1 is signalled with two phase values. The projector 3 projects, for example, onto the object 1 to be measured or an object area, a series of two structure sequences of out-of-phase grid lines and/or Gray code sequences, the two sequences having the rotation through 90° to each other. Like the measuring camera 4, the calibrating camera 5 records the intensity measurement values of the individual images of the sequences on each of its receiver elements.

With known algorithms of strip image evaluation, from the images recorded with the measuring camera 4 and the calibrating camera 5 can be calculated phase measurement values which correspond to the coordinates in the grid plane of the projection system, at each camera pixel point both for the measuring camera 4 and for the calibrating camera 5, wherein, due to the selected type of strip projection, e.g. rotated grid sequences at the point of the object 1 under observation, up to two phase measurement values per direction of illumination are obtained.

In the next step the sensor arrangement 2 is moved from the sensor position 1 into any other position, this position 2 being shown by the broken lines in FIG. 2 and FIG. 3. Here the station of the calibrating camera 5 relative to the object 1 remains unchanged. From this new position of the sensor arrangement 2, further structure sequences or grid lines are projected by the projector 3 in the same way as stated above onto the object 1 or object area, wherein again both the measuring camera 4 and the calibrating camera 5 simultaneously take the picture sequences or parts of them.

This process of switching the sensor arrangement 2 to other positions can be repeated until each area of the object to be measured has been detected at least once by the sensor arrangement 2, i.e. illuminated by the projector 3 and at the same time viewed with the measuring camera 4. In the process, the recording of measurements can be performed at the different positions successively, and then the necessary calculations can be made. However, calculations can also be made after each new position.

The sensor arrangement 2 and the calibrating camera 5 are connected to an evaluating device in which the necessary mathematical calculations are made for determining the three-dimensional coordinates of the object. Also, for evaluation of the phase information it is necessary for the geometry parameters of the projection system to be known. The spatial position of the individual projector positions is fixed by six external orientation parameters (three coordinates of the centres of projection, three Eulerian angles of rotation about the coordinate axes rotated as well). To calculate these geometry variables, a system of equations is set up with functional models of programmetry. The four phase values which are measured or calculated from the measured values are used as input variables. Also the spatial position of the measuring camera 4, which is also determined by orientation parameters, is obtained through the evaluating device. Here, the knowledge of the projection device as well as two phase measurement values are used.

The evaluation process will be explained below using FIG. 1. As already stated, the main condition of data evaluation is that the projector 3 signals the areas of the object 1 seen by the stationary calibrating camera 5 from at least two positions. Furthermore, care must be taken that the intensity measurement values for all lighting positions are always recorded by the calibrating camera 5 at the same object point $O_K$ on the surface of the object 1, i.e. relative movement between the object 1 and the calibrating camera 5 must not take place. In FIG. 1 this condition is shown with the aid of the beams 6, 7, 8 which all impinge on the object point $O_K$. The measuring camera 4 moved with it, on the other hand, detects different areas $O_1$ for each position 1 (1=1 . . . n). For simplification, of these object areas only one point $O_1$ or $O_2$ is always shown in the schematic view of FIG. 1.

Evaluation of the measuring operation for determining the 3-D coordinates of the surface of the object 1 is a three-stage process. Here basically only all projector positions are calculated, i.e. calibrated, then all measuring camera positions and finally the 3-D coordinates of the coordinates of the object detected from the positions of the sensor arrangement 2. This takes place, as stated above, after the complete recording of measurements or between the recording of measurements at different positions.

First Step of Evaluation:

In a first step of evaluation, using the projector image coordinates ($\xi^P_{1,k}$, $\eta^P_{1,k}$) recorded on the picture elements ($i^m_k$, $j^m_k$) with the stationary calibrating camera 5, i.e. phase measurement values which describe the object point $O_k$, the external and internal orientation parameters for all projector positions 1 are calculated by known methods of beam block equalisation. The main condition of this is, as stated above, that at least four phase images which have been generated during projection from at least two different projector positions 1 are available for the stationary camera. For each projector position, therefore, the six external orientation parameters which serve as the geometry parameters of the projectors and describe the spatial position of the individual projector positions are calculated. This calculation can be understood as calibration. The calibrating camera as an overview camera thus serves to record the homologous points or their pixels as "virtual homologous points".

Up to now, only one calibrating camera 5 has been mentioned. However, there may be provided a plurality of calibrating cameras 5 which are in a fixed relationship to the object point, the number of cameras being denoted as m (m≧1). These calibrating cameras 5 are arranged in different viewing positions, and so a larger object area can be detected, i.e. more complicated objects can be measured.

Second Step of Evaluation:

In position 1 of the sensor arrangement 2, the camera 4 with its matrix of receiver elements photographs the object 1, wherein here one point $O_1$ is picked out of the area which is shown by the beams 9 and 10. At the pixel point ($\xi^K_1$, $\eta^K_1$) of the camera 4 are obtained two items of measuring information ($\xi^P_{1,1}$, $\eta^P_{1,1}$) in the form of phase measurement values which correspond to the projector image coordinates in the grid plane. From these items of information and the orientation parameters of the projector 3 at position 1 calculated in the first step of evaluation, the orientation parameters of the measuring camera 4 at position 1 are calculated by free beam equalisation, i.e. the measuring camera is calibrated with respect to its position. In the process not just one point $O_1$ from the object area detected is used, but up to (i×j) points can be used, where i×j is the pixel number of the measuring camera 4 in row and column directions.

Afterwards the necessary orientation parameters which describe the sensor arrangement 2 at position 1 are available, wherein with the first step of evaluation the projector 3 and with the second step of evaluation the camera 4 are calibrated at this position.

Third Step of Evaluation:

Using the orientation parameters of the projector 3 and camera 4 at position 1, by conventional triangulation from the phase images are calculated the three-dimensional coordinates of point $O_1$ and hence of all object points (i×j) visible to the camera 4 in this position 1 or view 1. As the object point was signalled by two grid sequences and so two phase images are available, but only one phase measurement value is necessary, basically there is the option of calculating every point twice and settling it by averaging, so that the accuracy of measuring coordinates is increased.

Steps two and three of evaluation are performed for position 2 of the sensor arrangement 2 and then stepwise for all subsequent positions. As a result, a 3-D point cloud of the object is obtained with the measuring camera 4 from 1 viewing position and, if there is a plurality of calibrating cameras 5, additionally from m viewing positions.

Figure 4:
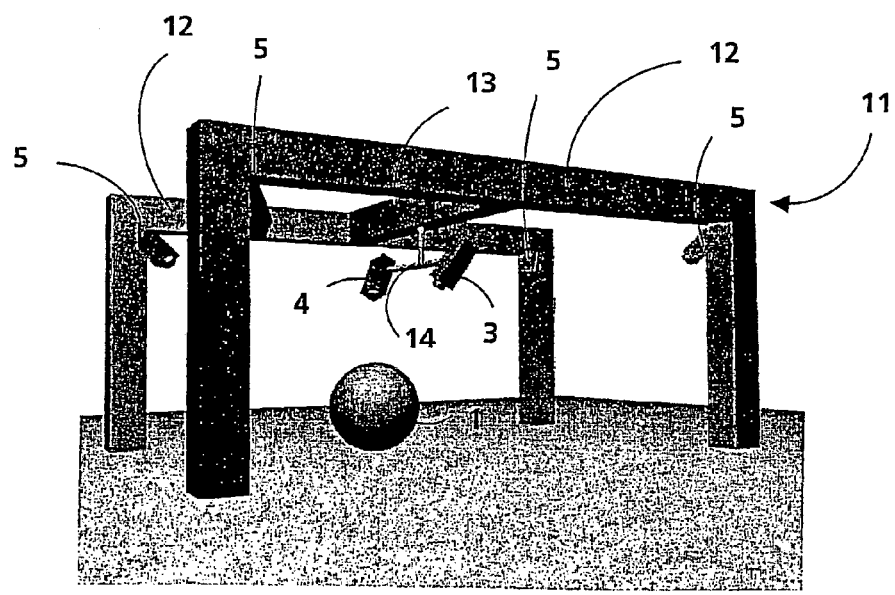

In FIGS. 4 to 7 are shown other options for a device for carrying out the method. In FIG. 4 a plurality of calibrating cameras 5 are attached to a frame 11 below which is arranged the object 1 and which consists of two portal-like, parallel girder elements 12 and a cross beam 13 connecting the girder elements 12. On the cross beam 13, the sensor arrangement 2 is attached to a rotating part 14 rotatable in all spatial directions, wherein the camera and/or the projector 3 too can be varied in their angle to the vertical.

Figure 5:
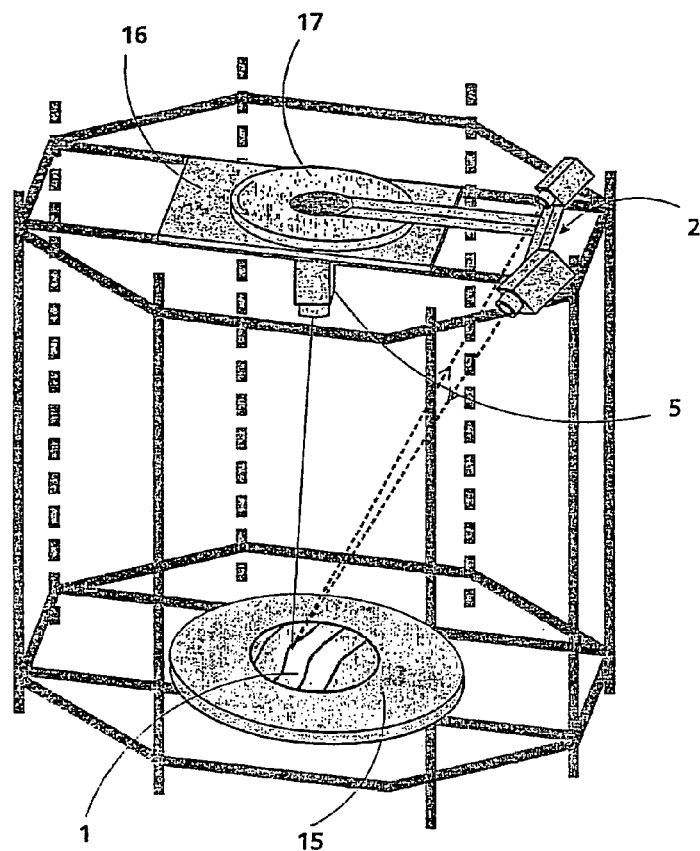

In FIG. 5 the object 1 is arranged on a measuring table 15 and a calibrating camera 5 is fixed to a frame 16 above the object. The sensor arrangement 2 is again attached to a rotating unit 17 in the axis of rotation of which is located the measuring table 16. The sensor arrangement thus turns about the object 1 at an angle to the vertical.

Figure 6:
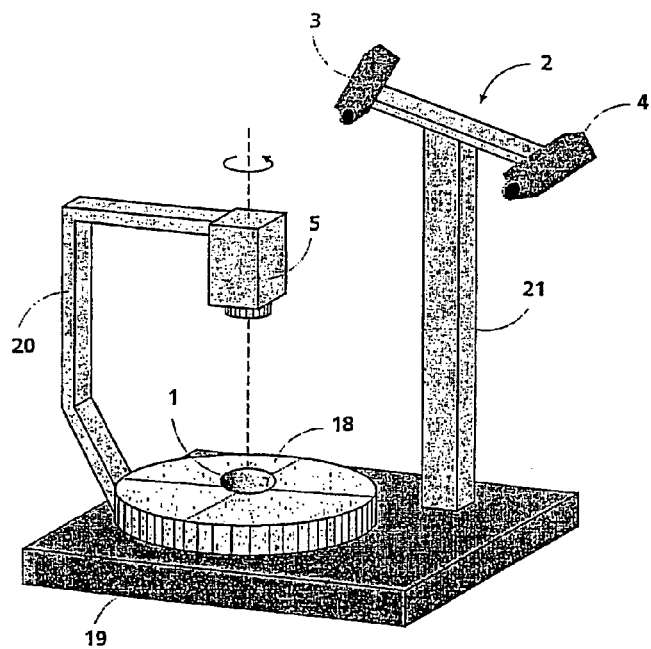

In FIG. 6 the measuring table is designed in the form of a turntable 18 which is rotatable relative to a base 19. The calibrating camera 5 is attached to the turntable by an arm 20 so as to stand over the object 1. Measuring camera 4 and projector 3 of the sensor arrangement 2 are attached to a beam 21 which is rigidly connected to the base 19.

Figure 7:
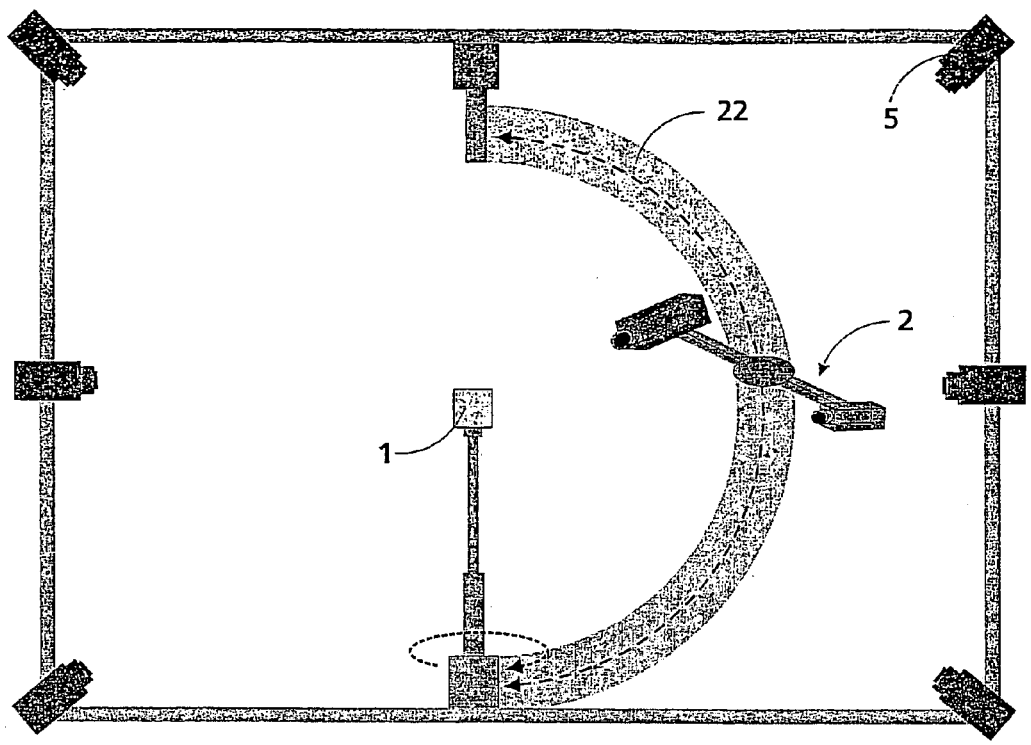

Finally, in FIG. 7 is shown a further device for carrying out the method. Here, the sensor arrangement 2 is attached to a circular guide track 22 rotatable about the object 1, in such a way that it can move in a semicircle and be positioned freely on the guide track, the guide track 22 being freely rotatable about the object 1 through an angle of up to 360°. A plurality of calibrating cameras 5 are attached to a frame 23 surrounding the guide track. Thus both the upper and the lower side of the object 1 can be detected.

The invention claimed is:

1. A method for determining the spatial coordinates of an object, in which the object is illuminated with light patterns with a projection device from at least two directions, and the projected light patterns are recorded point by point on the object with a two-dimensional-resolution first recording device, wherein, for the respective recorded points of the surface of the object, phase values are determined and these are used to calculate geometrical parameters and spatial coordinates of the points, characterised in that the light patterns or portions thereof projected onto the object from the at least two directions are additionally recorded point by point by at least one second recording device, wherein the at least one second recording arrangement remains stationary in relation to the object to be measured, and in that from the points of the projected light patterns recorded with the second recording device are determined at least four phase measurement values from which the geometrical parameters of the projection device for the at least two directions of projection are calculated.

2. The method according to claim 1, wherein after determination of the geometrical parameters of the projection device, the geometrical parameters of the first recording device are calculated using the geometrical parameters of the projection device with the respective projection device and at least two phase measurement values which are determined from the light patterns recorded with the first recording device and projected from the respective direction.

3. The method according to claim 1 or 2, wherein, using the predetermined geometrical parameters of the projection device and of the first recording device and at least one phase measurement value which is determined from the light patterns recorded with the first recording device and projected from the respective direction, the three-dimensional coordinates of the respective points of the object are calculated.

4. The method according to claim 3, wherein two phase measurement values are used and each spatial coordinate is calculated twice and averaging is carried out.

5. The method according to claim 1, wherein, after projection of the light patterns from a first direction and recording of the view of the object from a first direction, the projection device and the first recording device are changed from a first position to a second position for projection from a second direction and recording of another view of the object from a second direction.

6. The method according to claim 1, wherein, for measurement of different views of the object, the projection device and the first recording device are changed together to different positions.

7. The method according to claim 1, wherein the geometrical parameters of the projection device and of the first recording device are orientation parameters.

8. The method according to claim 1, wherein the object is illuminated from each direction of projection in a first step with a line grid and/or Gray code sequences and in a second step with the line grid rotated through 90° relative to the direction of projection and/or the Gray code sequences rotated through 90°.

9. A device for carrying out the method according to claim 1, with at least one sensor arrangement comprising a projection device which projects light patterns and a first, two-dimensional-resolution recording device for recording an object illuminated with the light patterns, with at least one second recording device for recording the object illuminated with the light patterns, with a measuring table which holds the object to be measured, and with an evaluating device for determining parameters of the measuring system and/or spatial coordinates of the object, wherein the at least one second recording device is stationary in relation to the object held on the measuring table, and the sensor arrangement and the object are movable relative to each other.

10. The device according to claim 9, wherein the projection device and the first recording device of the sensor arrangement are rigidly connected to each other.

11. The device according to claim 9, wherein the projection device and the first recording device of the sensor arrangement are movable and/or changeable independently of each other.

12. The device according to claim 9, wherein the sensor arrangement is arranged on a rotating unit at the centre of which is located the measuring table, and the sensor arrangement performs a rotational movement in relation to the object.

13. The device according to claim 9, wherein the measuring table is rotatable and the at least one second recording device is rigidly connected to the rotatable measuring table, while the sensor arrangement is arranged stationarily.

14. The device according to claim 9, wherein the sensor arrangement is attached so as to be freely positionable to a guide track rotatable about the measuring table preferably through 360°.

15. The device according to claim 9, wherein a plurality of second recording devices are provided stationarily relative to the measuring table.

16. The device according to claim 9, wherein the second recording device comprises at least three photodetectors.

* * * * *